Figure 1:
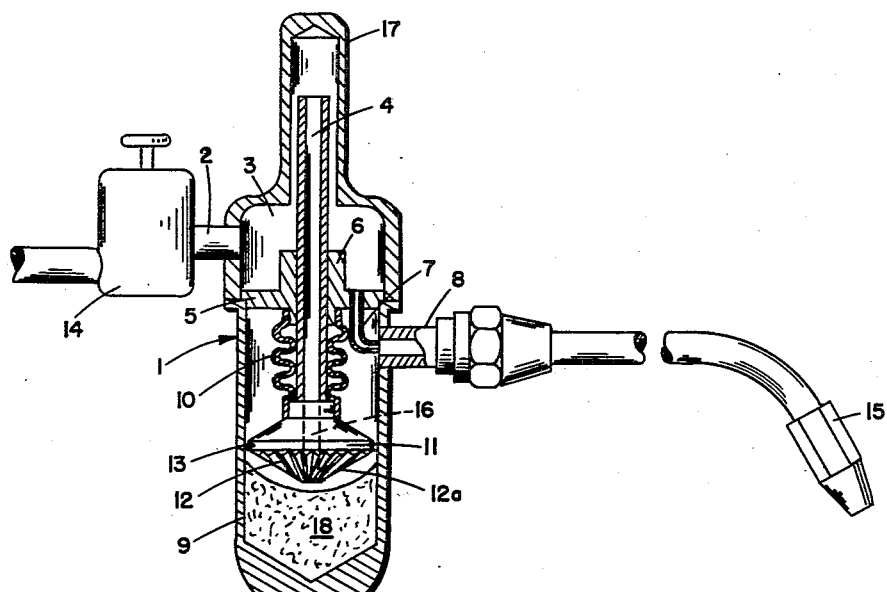

Feb. 12, 1957  H. L. MEREDITH  2,781,154

METALLIC POWDER PROJECTOR

Filed Dec. 23, 1955

*INVENTOR.*
HARLAN L. MEREDITH

BY

ATTORNEY

2,781,154

METALLIC POWDER PROJECTOR

Harlan L. Meredith, Norwalk, Calif., assignor to North American Aviation, Inc.

Application December 23, 1955, Serial No. 555,177

9 Claims. (Cl. 222—193)

This invention relates to a powder projector or atomizer and, more particularly, to a metallic powder projector for use in high temperature brazing and surfacing operations.

High temperature brazing and surfacing operations are limited by the available processes. The present technique is to apply the surfacing alloy to the present metal by metallic-arc welding or gas welding, using cast rod or tube rod for the latter. The disadvantage of the filler metal forms used in the above is that the smallest electrodes or tube rods available produce deposits of hard surfacing alloys which are too large, and subsequent machining operations are required to remove obtuse portions of the overlay. Some operations require the surfacing of wide susceptible edges where the finished edges must be thin. Finishing, then, requires extensive machining of the sides to provide thin edges. These typical operations are expensive and laborious.

The process of surfacing or hardfacing is the act of applying, by arc or gas welding, an integral layer of metal which is of different composition from the metal to which it is applied. The surfacing metal generally has a lower melting point than the parent metal and, thus, the process is closely related to high temperature brazing.

The purpose of surfacing is to provide a surface which resists hard abrasive and friction wear or corrosion. Many applications exist in which a cheap base metal can be used if its wearing or exposed surface can be surfaced with a hard alloy.

When the parts to be surfaced are huge or moderately large, the present commercial rods and electrodes and allied processes (such as flame spraying and flame plating) are quite adequate. Various forms of surfacing material are presently available; and these forms exist as twist composite wire, cast rod, pure iron tube filler with powder alloys, and packaged fragmented powder alloys. However, the smallest diameter rod which can be manufactured easily for torch surfacing is 1/8 inch in diameter, and this is too large for small section surfacing and high temperature brazing. Other surfacing material as the pure iron tube type, above, limits the hardenability of the deposited surfacing alloy. The present invention eliminates the need for rods and iron tubes and makes possible an increase in the hardenability of the surfacing alloy. Further, it eliminates the need for flux. The use of flux is very undesirable in the fabrication of fuel and propellant piping and tank systems.

Fundamentally, any two metals can be joined by heating them to their respective melting points, provided that the heat-affected zone is maintained clean throughout the operation. In the same manner, two metals, similar or not, can be joined by adding a third metal.

The present invention is provided for implementation of the above principle along with a heat surface, a monatomic inert gas, and a filler meal. The inert gas is used to mechanize the dispensing of the metal powder and for nonreactive gaseous protection against air contamination. The powder dispenser takes the place of a solid filler wire which could have been controlled manually, automatically and/or remotely. The heat can be provided by induction; oxy-acetylene, oxy-hydrogen, air natural gas or oxygen-natural gas flames; or by metallic arcs, when using metallic carbides.

The present invention has been provided to make possible high temperature brazing or welding without flux and surfacing, with or without flux, by using fragmented powder alloys or mixtures of fragmented metals. For brazing, the powdered metals used have melting points lower than those of the parent metal being surfaced; and for welding, have melting points equal to those of the parent metal. Use of the metal powder projector for surfacing or joining without flux eliminates the cost of the flux, the cost of removing flux residues, and minimizes accelerated corrosion due to entrapped flux residues.

Therefore, an object of this invention is to provide an improved metallic powder projector.

A principal object of this invention is to provide a metallic powder projector which deposits dry powder, of 325 to 60 mesh, in a fine or heavy spray form on heated surfaces to form a homogeneous film, layer, braze or weld.

A further object of this invention is to provide a metallic powder projector which will spray metal powder in a finely suspended fog.

A still further object of this invention is to provide a powder projector which operates with a low gas pressure, 5 to 20 pounds per square inch, and at a low gas velocity, 2 to 8 feet per second.

Another object of this invention is to provide a powder atomizer which utilizes an inert monatomic gas as a turbulence atomizer, as a fog carrier and as a gaseous protector functioning as an inert flux.

Figure 2:
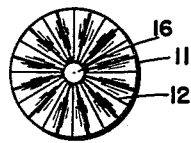

Other objects of invention will become apparent from the following description taken in connection with the accompanying drawings, in which Fig. 1 is a partially cross sectional view of the projector showing the regulating valve and nozzle;

And Fig. 2 is an end view of the atomizer plunger showing the radial grooves.

Referring to Figs. 1 and 2, atomizer body 1 is shown in cross section. Inlet valve 14 is shown on inlet tube 2, which is open to manifold 3. Manifold 3 is comprised generally of a cylindrical chamber extending into an upper elongated tube 17. Powder reservoir 9, extending below manifold 3, is separated from the latter by bushing plate 5. Plunger 11 is loosely held in reservoir 9 just above the surface of powder 18. Secured in plunger 11 is open-ended, hollow stem 4. Hollow stem 4 is open to manifold 3 and is open to reservoir 9 through orifice 16 in plunger 11, thereby providing a path for the flow of gas from manifold 3 into reservoir 9. Stem 4 is slidably engaged in bushing 6 and is held for breathing type movement by flexible bellows 10. Bellows 10 is secured on bushing 6 and plunger 11, and seals the stem and the bushing from powder 18 in reservoir 9. Tube 7 is an additional gas conduit from manifold 3 into reservoir 9, and is positioned so as to cause the flow of gas therefrom directly into nozzle tube 8 which is open to reservoir 9. Between plunger 11 and the inner cylindrical wall of reservoir 9 is narrow annulus 13. The lower or actuating end 12a of plunger 11 is of conical shape and has a series of V-shaped grooves 12 which extend radially outward from orifice 16.

In operation, a monatomic inert gas, such as argon or helium, is passed through variable inlet valve 14 into manifold 3 and manifold head 17 from which it flows into orificed plunger stem 4 and ejection assist tube 7. Inside reservoir 9 the gas emerges from opening 16 in plunger 11 and flows against the powder and into the diametrically opposed grooves 12 on conical surface 12a. The flow of gas through grooves 12 causes gaseous turbulent flow which agitates and picks up the metal powder, causing it to be suspended in a fog formed with the gas. The fog is forced upward through annular space 13 to the upper half of the reservoir, out nozzle tube 8, and nozzle 15. Nozzle 15 is directed toward a heated surface or area intended for surfacing or joining. Bellows 10 protects the exterior of stem 4 and the interior of bushing 6 from the abrasive action which would occur if the powder were permitted to enter the bushing around the stem. Jet tube 7 is designed to aid in producing the proper fog metal flow, out through the nozzle. The flow of the gas through tube 7 is at considerably higher velocity than the flow through stem 4, because the former has a smaller diameter than the latter.

The intensity of the projected metal powder fog depends upon the design and orificing of the plunger stem, the inlet gas pressure and its flow rate, the velocity of the gas through the assisting carrier tube, the mesh size of metallic powder, and the outlet nozzle orificing. However, the grooves and the conical shape of the end of the plunger adjacent to the powdered metal provide the efficacious turbulence of the gas which makes possible the lifting and subsequent proper fogging of the metal. The lifting of the small metal particles against gravitational pull, and the consequent falling thereof, greatly aids in the fogging of the metal in the gas.

The weight of plunger 11 should be sufficient to stretch bellows 10 so that the plunger is resting on the powder in the reservoir when gas is not flowing through stem 4. When gas flows through stem 4 to the bottom end of the plunger, the plunger is raised by the pressure exerted against its conical face 12a. This, then, along with the flow and fogging of the metal into the upper portion of the reservoir, causes the plunger and bellows to move in a breathing type motion. As the powder metal is removed from the reservoir, the plunger will tend to lower because of the additional space created in the lower portion of the reservoir. The breathing action of the plunger is made possible by the low flow rate of the gas. A higher flow rate would tend to hold the plunger more rigidly in an upward position and would also blow the powder metal with too hard a force against the parent metal to retain it there and to effect smooth surfacing. The low rate also saves a considerable quantity of gas.

In typical operations using the present invention, carbon steel is frequently used as the parent metal and is surfaced with such hard facing alloys in powder form as the nickel-silicon-boron type.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A powder atomizer comprising a body, a manifold in said body, a gas inlet to said manifold, a reservoir for powdered material adjacent said manifold, a loosely held plunger in said reservoir, a first gas conduit between said manifold and said reservoir, means on said plunger adjacent said first conduit to cause turbulent flow in said reservoir, a discharge nozzle tube connected to said reservoir, and additional conduit means connecting said manifold and said reservoir, said additional conduit open to said reservoir adjacent to and directed toward said nozzle tube.

2. A powder atomizer comprising a body, a manifold in said body, a gas inlet to said manifold, a regulating valve in said inlet, a reservoir for powdered material adjacent said manifold in said body, a loosely held plunger in said reservoir, an open-ended hollow stem attached to said plunger, said stem connecting said manifold with said reservoir through an orifice in said plunger, a bushing plate separating said manifold and said reservoir, said stem slidably engaged in a bushing in said plate, means on said plunger to cause turbulent flow in said reservoir, flexible means surrounding said stem between said plunger and said bushing, said flexible means protecting said bushing and said stem from said powdered material, a discharge nozzle tube connected to said reservoir, and additional conduit means connecting said manifold and said reservoir, said additional conduit open to said reservoir adjacent to and directed toward said nozzle tube.

3. The atomizer according to claim 2 in which said flexible means is a bellows.

4. A powder atomizer comprising a body, a gas manifold in said body, a gas inlet to said manifold, a regulating valve in said inlet, a reservoir for powdered material in said body, said reservoir being adjacent and below said manifold, a loosely held plunger in said reservoir, a hollow open-ended stem having one end attached to one end of said plunger, the other end of said stem extending into said manifold, said stem open to said reservoir through an orifice in said plunger, a bushing plate separating said manifold from said reservoir, said stem slidably engaged in a bushing in said plate, groove means on the other end of said plunger to cause turbulent flow of said gas in said reservoir, flexible means holding said stem in said bushing, said flexible means adapted to protect said bushing and said stem from said powdered material, a discharge nozzle tube connected to said reservoir, said plunger being between said nozzle tube and said powdered material, and additional conduit means connecting said manifold and said reservoir, said conduit means open to said reservoir adjacent said nozzle tube, said conduit adapted to increase the flow through said nozzle tube.

5. The atomizer according to claim 4 in which said flexible means is a bellows surrounding said stem, said bellows having one end connected to said bushing and the other end connected to said one end of said plunger.

6. A powder atomizer comprising a body, a gas manifold in an upper portion of said body, a gas inlet to said manifold, a regulating valve in said inlet, a reservoir for powdered material in said body, said reservoir being below said manifold, a loosely held plunger in said reservoir; an open-ended, hollow stem having one end attached to one end of said plunger; the other end of said stem extending into said manifold, said stem open to said reservoir through an orifice in said plunger, a bushing plate separating said manifold from said reservoir, said stem slidably engaged in a bushing in said plate, a flexible bellows surrounding said stem between said bushing plate and said one end of said plunger, a discharge nozzle tube connected to said reservoir, said plunger being between said nozzle tube and said powdered material, radial groove means on the other end of said plunger to cause turbulent flow of said gas in said reservoir, and an additional conduit connecting said manifold and said reservoir, said additional conduit open to said reservoir adjacent to and directed toward said nozzle tube.

7. A powder projector comprising a body, a gas manifold in an upper portion of said body, a gas inlet tube connected to said manifold, a regulating valve in said inlet tube, a substantially cylindrical reservoir for powdered material in said body below said manifold, a circular plunger in said reservoir, said plunger adapted for longitudinal movement in said reservoir, said plunger spaced in said reservoir so that a small annulus exists between the inner wall of said reservoir and said plunger; a longitudinally directed, open-ended, hollow stem having one end attached in the approximate center of one end of said plunger; the other end of said stem extending into said manifold, said stem open to said reservoir through an orifice centrally located and longitudinally directed in said plunger and extending through its other end, a bushing plate separating said manifold from said reservoir, said stem slidably engaged in a bushing in said plate, a flexible bellows surrounding said stem between said bushing plate and said one end of said plunger, grooves in said other end of said plunger, said grooves extending radially outward from said orifice, a discharge nozzle tube connected to said reservoir, said plunger being between said nozzle tube and said powdered material, and an additional gas conduit connecting said manifold and said reservoir, said additional gas conduit open to said reservoir adjacent to and directed toward said nozzle tube.

8. The atomizer as recited in claim 7 in which said other end of said plunger is of conical shape.

9. A powder atomizer comprising a body, a manifold in said body, a gas inlet to said manifold, a reservoir for powdered material adjacent said manifold, a loosely held plunger in said reservoir, a gas conduit between said manifold and said reservoir, means on said plunger adjacent said conduit to cause turbulent flow in said reservoir, and a discharge nozzle tube connected to said reservoir.

No references cited.